UNITED STATES PATENT OFFICE.

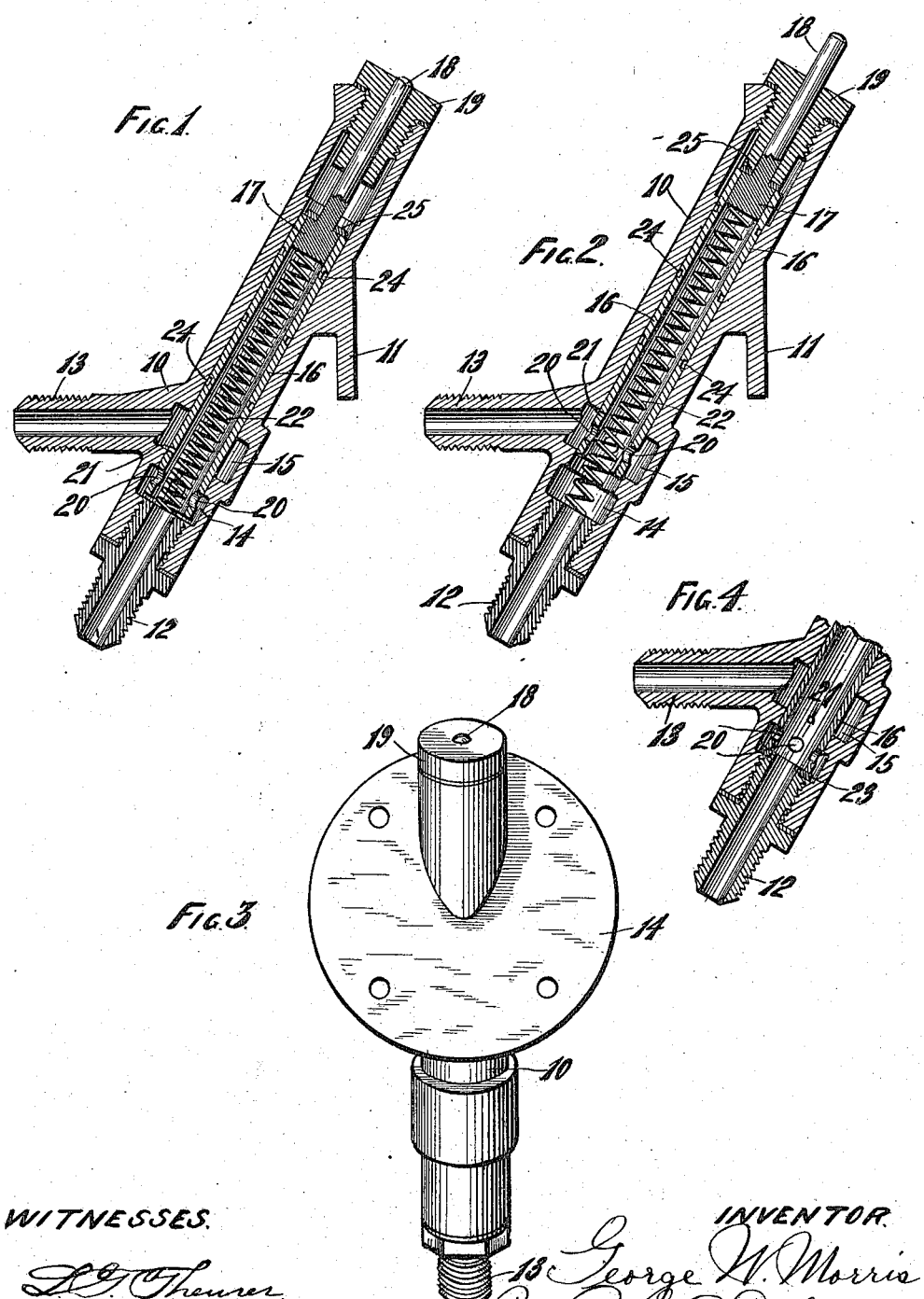

GEORGE W. MORRIS, OF RACINE, WISCONSIN.

OIL-PUMP INDICATOR.

1,221,078.  Specification of Letters Patent.  Patented Apr. 3, 1917.

Application filed April 17, 1915. Serial No. 21,956.

*To all whom it may concern:*

Be it known that I, GEORGE W. MORRIS, a subject of the King of Great Britain, and resident of Racine, in the county of Racine and State of Wisconsin, have invented new and useful Improvements in Oil-Pump Indicators, of which the following is a description, reference being had to the accompanying drawings, which are a part of this specification.

This invention has for its object to provide an indicator for oil pumps, such as the pumps used for the lubricating systems of automobile engines and the like, which will be simple in its construction and inexpensive to manufacture, and which will be sensitive to the pulsations in the lubricating system caused by the operation of the pump and which will indicate these pulsations by the movements of a projecting stem, suitable provision being made for preventing the escape of lubricant around the stem.

Another object of the invention is to cushion the downward movement of the plunger so as to avoid the metallic click produced thereby when such cushioning is not provided for.

Another object of the invention is to provide the plunger with an air vent which will prevent its responding to the operation of the pump when there is no oil present and the pump is merely forcing air through the system.

With the above and other objects in view the invention consists in the oil pump indicator as herein claimed and all equivalents.

Referring to the accompanying drawings, in which like characters of reference indicate the same parts in the different views:

Figure 1 is a longitudinal sectional view of an oil pump indicator constructed in accordance with this invention, the plunger thereof being in its lowermost position;

Fig. 2 is a similar view thereof with the plunger in its uppermost position;

Fig. 3 is a front elevation thereof; and,

Fig. 4 is a detail sectional view of a modified form of means for cushioning the plunger.

In these drawings 10 indicates a tubular casing, preferably arranged inclined as shown, with a vertical face plate 11 adapted to be secured to the dash board of an automobile or other part to which the indicator is to be attached, and 12 is a nipple forming a pump connection threaded into the lower end of the casing and adapted to be connected with a pipe leading from the lubricant pump, not shown, while 13 is a threaded nipple or pipe connection formed on the casing near the bottom thereof and adapted for connection with a pipe for conveying the lubricant to the parts of the engine or other mechanism to be lubricated. The tubular casing 10 may be cast with a bore of slightly smaller diameter than desired for the finished device and with a pair of annular enlargements near its lower end forming chambers 14 and 15 respectively, the former at the end of the threaded opening into which nipple 12 is turned, and the latter communicating with the passageway of the lubricant supply connection 13. The chamber 14 thus affords a space into which the thread cutting tap for cutting the threaded opening may enter, and into which also may enter the reamer or other cutting tools for cutting the walls of the cylinder to the proper size. The reamed cylindrical bore extends through the main portion of the tubular casing, including the partition-like formation between the chambers 14 and 15, and closely fitting within this bore is a tubular plunger 16 which has a plug 17 tightly fitting in its upper end and carrying a stem 18 which has a working fit within a screw plug or bushing 19 threaded in the upper end of the casing. In the lowermost position of the plunger, as shown in Fig. 1, the end of the plunger stem 18 lies practically flush with the flat end of the bushing 19, but in the uppermost position of the plunger, as shown in Fig. 2, said stem projects above the flat surface of bushing 19 a distance equal to the travel of the plunger. In this uppermost position of the plunger the lower end thereof does not clear the partition between chambers 14 and 15, but said plunger near its lower end is provided with openings 20 through which the oil may flow into the chamber 15 and then out through the nozzle 13 to the mechanism to be lubricated. These openings 20 in the downward movement of the plunger are carried beneath the partition between chambers 14 and 15, but another opening 21 in the plunger which is higher than the openings 20 and remains in connection with the chamber 15 in the lowermost position of the plunger, constitutes a vent to permit air when pumped by the lubricant pump in the absence of a supply of lubricant, to pass through without lifting the plunger as is done with each impulse of the pump when the system is filled with oil.

In order that the downward movements of the plunger may not be limited by the engagement of the plunger with the metal parts beneath it and thereby produce a metallic click, a suitable yielding buffer is provided which may consist of a coil spring 22 within the plunger 16 engaging the end of nipple 12 and of just sufficient strength to cushion the plunger, and thus quiet the operation of the plunger. This buffer may consist of a leather gasket 23 as shown in Fig. 4, which is positioned on the upper end of the nipple 12 and is engaged by the plunger 16.

In operation the plunger 16 is forced upwardly by the lubricant therebeneath with each impulse of the lubricant pump, thus causing the stem 18 to project, as shown in Fig. 2, while the lubricant is flowing out through the openings 20 into the chamber 15 from which it flows through the nipple 13 to the machinery to be lubricated. The plunger 16 returns to its lower position immediately after the impulse, but is prevented from making a sound at the end of its stroke by the presence of the spring 22 or the gasket 23, and by the movements of the stem 18 it may be known that the lubricating system is operating properly, for in the event of the supply of oil becoming exhausted there will be no reciprocation of the plunger 16, and consequently no movement of the stem 18, such air as may be pumped by the lubricant pump being permitted to escape through the vent opening 21 without lifting the plunger. The bore of the plunger forms an air dome within which the air is compressed during the impulse of the pump to continue the pressure when the pump impulse ceases, so as to make the flow of oil more uniform. Should the pump cease to operate for any cause, this, of course, will be indicated by the absence of pulsations of the stem 18. Furthermore, the proper operation of the lubricating system being indicated by the stem 18 moving inwardly and outwardly it may be readily determined by feeling the stem at times when it can not be seen. Instead of providing a cup on the upper end of the bushing 19 to retain oil which may pass the plunger stem, in the present case I rely on the liquid packing grooves 24 on the exterior of the plunger, and a leather gasket 25 surrounding the stem 18 and engaging the end of the bushing 19 to prevent the oil being forced out.

With the present construction the machine work is reduced to a minimum, the plunger consisting of a piece of standard gage tubing which is very accurate as to size and requires no work upon it after having the openings 20 and 21 drilled therein and the plug 17 of the stem forced therein. The arrangement is such as to facilitate the machine work on the casing, for the reamer passed through the bore of the cylinder portion and the partition between chambers 14 and 15 finishes the surface thereof to make a proper fit with the plunger, and the threading of the ends of the casing for receiving the nipple 12 and the bushing 19 may be done without marring the surface of the cylinder portion. This makes for economy of manufacture and efficiency of operation.

What I claim as new and desire to secure by Letters Patent is:

1. In an oil pump indicator, a casing having a chamber with an inlet passageway leading thereto from the oil pump and having a second chamber with a passageway leading therefrom and a partition between the two chambers, a plunger fitting within a bore of the casing which extends through the partition, said plunger being movable under the influence of the pressure of the oil from the pump and having openings movable into and out of register with the second chamber for affording a free flow of lubricant through the plunger from the first chamber to the second chamber when the plunger is in the position to which it is moved upon receiving an impulse from the pump.

2. In an oil pump indicator, a casing, a plunger slidably fitting therein, said casing having an oil inlet passageway for connection with an oil pump and an oil outlet passageway, the end of the plunger having an opening to communicate with the oil inlet passageway and there being openings near the end of the plunger to be moved into and out of register with the oil outlet passageway with the movements of the plunger, and a stem projecting from the casing and movable with the plunger.

3. In an indicator for oil pumps, a tubular casing, a tubular plunger fitting therein with its upper end closed and constituting an air dome and its lower end open and communicating with an oil inlet passageway of the casing adapted for connection with the oil pump and having openings in its side walls movable into and out of register with an oil outlet passageway of the casing, and a stem projecting from the casing and moved by the plunger.

4. In an indicator for oil pumps, a tubular casing, a tubular plunger fitting therein with its upper end closed and constituting an air dome and its lower end open and communicating with an oil inlet passageway of the casing adapted for connection with the oil pump and having openings in its side walls movable into and out of register with an oil outlet passageway of the casing, and there being a small air vent opening in the side walls of the plunger above the said openings and communicating with the oil outlet passageway, and a stem projecting from the casing and moved by the plunger.

5. In an oil pump indicator, a casing, a plunger fitting therein and interrupting communication between an oil inlet passageway and an oil outlet passageway of the casing and adapted to be moved by the influence of pressure within the oil inlet passageway and having openings to establish communication between the oil inlet passageway and the oil outlet passageway when so moved, yielding means for cushioning the end movement of the plunger, and a stem projecting from the casing and moved by the plunger.

6. In an oil pump indicator, a casing having an oil inlet passageway and an oil outlet passageway, the former adapted for connection with an oil pump, a hollow plunger fitting within the casing interrupting communication between the oil inlet passageway and the oil outlet passageway and having openings to establish communication between them in a position to which it is moved under the influence of the pressure of the oil, a coil spring within the hollow plunger seated on the casing for cushioning the movement of the plunger, and a stem projecting from the casing and moved by the plunger.

In testimony whereof, I affix my signature, in presence of two witnesses.

GEORGE W. MORRIS.

Witnesses:
THOMAS WILLIAMS,
F. H. FOSTER.

Copies of this patent may be obtained for five cents each, by addressing the "Commissioner of Patents, Washington, D. C."